(12) United States Patent
Harres

(10) Patent No.: US 11,066,246 B2
(45) Date of Patent: Jul. 20, 2021

(54) EXTENDIBLE CONVEYOR WITH IRREGULAR PARCEL HANDLING

(71) Applicant: Siemens Logistics LLC, DFW Airport, TX (US)

(72) Inventor: Luiz Carlos Harres, Allen, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/816,897

(22) Filed: Mar. 12, 2020

(65) Prior Publication Data

US 2020/0339356 A1    Oct. 29, 2020

Related U.S. Application Data

(63) Continuation of application No. 16/394,054, filed on Apr. 25, 2019, now abandoned.

(51) Int. Cl.
*B65G 21/14* (2006.01)
*B65G 67/08* (2006.01)
*B65G 67/20* (2006.01)

(52) U.S. Cl.
CPC .............. *B65G 21/14* (2013.01); *B65G 67/08* (2013.01); *B65G 67/20* (2013.01)

(58) Field of Classification Search
None
See application file for complete search history.

(56) References Cited

U.S. PATENT DOCUMENTS

| | | | |
|---|---|---|---|
| 5,088,873 A * | 2/1992 | Ruder | B65G 67/08 414/392 |
| 6,481,563 B1 * | 11/2002 | Gilmore | B65G 21/14 198/511 |
| 6,571,938 B2 * | 6/2003 | Gilmore | B65G 21/14 198/594 |
| 9,862,552 B2 * | 1/2018 | Beer | B65G 47/841 |
| 10,689,212 B2 * | 6/2020 | Bangalore Srinivas | B65G 67/20 |
| 2017/0312789 A1 * | 11/2017 | Schroader | B65G 47/54 |

* cited by examiner

*Primary Examiner* — William R Harp

(57) ABSTRACT

An extendible conveyor system having an extendible conveyor configured to extend into a container, at least one belt on the extendible conveyor configured to transport an irregular parcel from the container to a base end of the extendible conveyor, and a transfer mechanism configured to move the irregular parcel from the at least one belt to a shelf. A method includes transporting an irregular parcel on the at least one belt from the container to a base end of the extendible conveyor and moving the irregular parcel from the at least one belt to a shelf using the transfer mechanism.

18 Claims, 14 Drawing Sheets

EXTENDIBLE CONVEYOR WITH IRREGULAR PARCEL HANDLING

CROSS-REFERENCE TO RELATED APPLICATION

This is a continuation of U.S. patent application Ser. No. 16/394,054, filed Apr. 25, 2019, which is hereby incorporated by reference.

TECHNICAL FIELD

The present disclosure is directed, in general, to system and methods for parcel handling, in particular when using a conveyor system to unload parcels from a container.

BACKGROUND OF THE DISCLOSURE

Improved and more efficient systems for unloading parcels and other items from a container or trailer are desirable.

SUMMARY OF THE DISCLOSURE

Various disclosed embodiments include an extendible conveyor system having an extendible conveyor configured to extend into a container, at least one belt on the extendible conveyor configured to transport an irregular parcel from the container to a base end of the extendible conveyor, and a transfer mechanism configured to move the irregular parcel from the at least one belt to a shelf.

A method includes transporting an irregular parcel on the at least one belt from the container to a base end of the extendible conveyor and moving the irregular parcel from the at least one belt to a shelf using the transfer mechanism.

In various embodiments, the shelf is a takeaway conveyor. Various embodiments include a control system configured to control the at least one belt and the transfer mechanism to transport the irregular parcel from the container and onto the shelf. Various embodiments include an input device configured to receive a user input that the irregular parcel is to be transported. Various embodiments include a distance sensor configured to detect when the irregular parcel has reached the transfer mechanism. Various embodiments include an indicator configured to be activated when the transfer mechanism cannot transfer the irregular parcel from the at least one belt to the shelf. In various embodiments, the transfer mechanism is configured to restrain the at least one belt when the irregular parcel is being moved to the shelf. In various embodiments, the transfer mechanism includes an elevator conveyor. In various embodiments, the transfer mechanism includes a pushbar configured to push the irregular parcel from the at least one belt and onto an elevator conveyor. In various embodiments, the transfer mechanism includes an elevator conveyor and a lift pushbar configured to push the irregular parcel from the elevator conveyor and onto the at least one belt. In various embodiments, the transfer mechanism includes an elevator conveyor and a low-friction transfer surface disposed between the elevator conveyor and the at least one belt.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
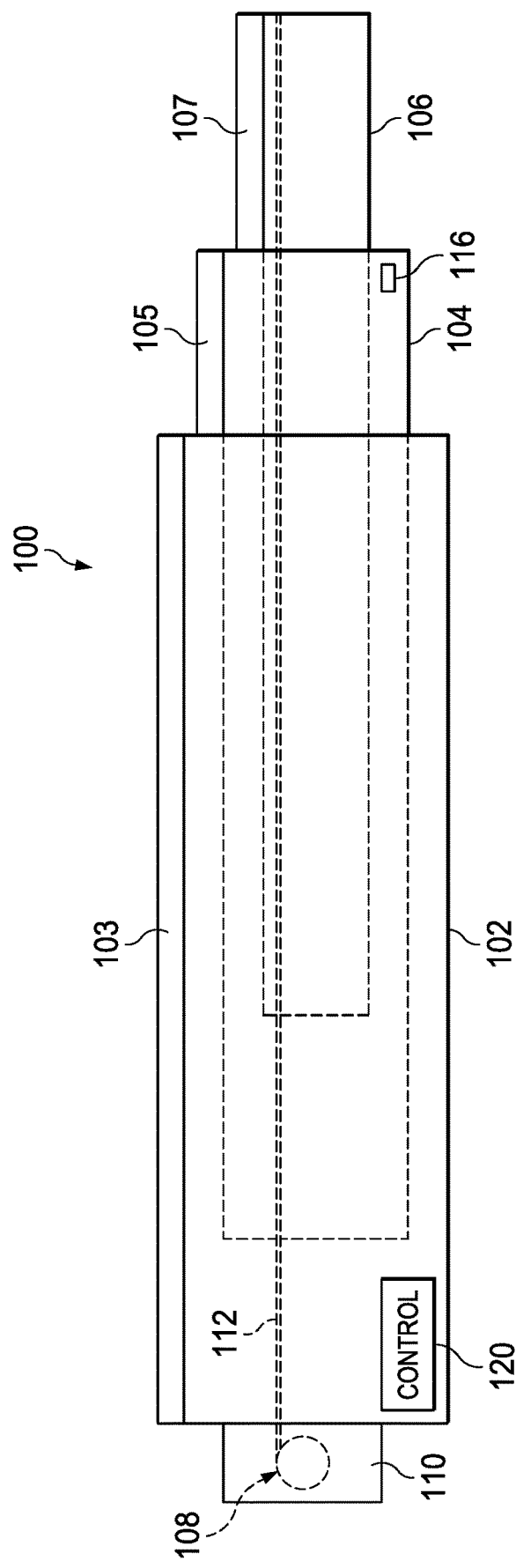
FIG. 1 illustrates a schematic diagram of an extendible boom conveyor system.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extendible loaders (or simply "extendibles") are often implemented at loading docks for trucks, trailers or the like.

Some extendible loaders (referred to as "gravity loaders") are extendible into a truck/trailer or other container and angled downward such that gravitational forces cause packages to move down the loaders along a plurality of rollers. Other extendible loaders include a powered conveyor belt or other transport mechanism, which may be used to move packages into or out of a container.

The loaders may be extended to reach further into the trailer, in order to minimize the manual lifting and carrying of the packages, and retracted to a stored position to minimize the space taken up by the loader when not in use. However, because of the substantial size and weight of these loaders, extension and retraction is often accomplished by powered extension and retraction systems, which are typically complicated and expensive devices. The powered extension and retraction systems are often used to stop and hold the loader at the desired degree of extension. In other loaders, devices are arranged to apply additional friction to sliding or rolling elements of the loader in order to resist extension of the loader or to lock the loader in its current position.

Organizations that operate their own logistic systems, such as delivery services and major retailers, rely on the transportation and distribution of parcels and package goods in shipping containers and trailers. Other companies provide logistic-related services to their customers that involve the same activities. As comingled items with a plurality of ultimate destinations move through the logistic network, they are distributed, aggregated, and transported, through a process whereby individual items with common destinations are ultimately batched, transported, and delivered together. In this process, the items tend to be loaded and unloaded multiple times.

Irregular parcels, also called "non-conveyables", "incompatibles", "IC", or other terms, are those that are odd shaped or too large and heavy to be processed on the conveyor with other parcels. These irregular parcels are currently carried manually out of the container (such as a trailer) and handed off to another worker. This process is time consuming and potentially hazardous to the worker. The other parcels are simply placed on an extendible conveyor that follows the worker into the trailer to minimize walking. A standard extendible conveyor cannot be used for irregulars because these items will get stuck in the downstream conveyors. So, the worker must carry these items around the extendible and hand it off to another worker at the dock. Disclosed embodiments provide improved conveyor systems and methods for handling irregular parcels.

FIG. 1 depicts a schematic diagram of an extendible boom conveyor system 100. A rear boom element 102 encloses portions of a middle boom element 104 and a front boom element 106. As shown in FIG. 1, the boom apparatus 100 is in a substantially retracted configuration, with the middle boom element 104 and the front boom element 106 substantially retracted within the rear boom 102. Conveyor apparatuses 103, 105 and 107 are included on sides of the boom elements 102, 104 and 106, respectively, such that items may pass from one to another of the conveyor apparatuses 103, 105 and 107 along the extendible boom conveyor system 100 into or out of a container. In some embodiments, the conveyor apparatuses 103, 105 and 107 include one or more of wheels, rollers, or low friction surfaces, to allow items to move by gravity into or out of a container. In other embodiments, the conveyor apparatuses 103, 105 and 107 may include one or more powered strips or belts that carry items into or out of a container. In still other embodiments, a single conveyor apparatus may extend along the upper surfaces of some or all of the boom elements 102, 104 and 106, and extend and retract along with the boom elements 102, 104 and 106. Each boom element has a conveyor surface.

Extension and retraction of the boom apparatus 100 may be accomplished by a boom drive mechanism 108, comprising a winch 110 and cable 112 extending through the rear boom element 102 and the middle boom element 104. Front boom element 106 can have a separate drive mechanism 116 that can include its own controllers, sensors, actuators, and other elements, and can communicate with drive mechanism 108 or other controllers. Drive mechanism 116 can be mounted on the front boom element 106 or on the middle boom element 104.

In some embodiments, front boom element 106 can comprise a lighter-weight material than the structure of the other boom elements, so that it can be more quickly extended and retracted. Similarly, drive mechanism 116 can operate so as to extend and retract front boom element 106 more quickly and responsively than drive mechanism 108 moves the middle boom element 104.

In various embodiments, drive mechanism 116 can automatically extend and retract front boom element 106 to maintain a safe but efficient distance from an operator that is loading parcels onto the conveyor apparatus (referred to in the singular for simplicity, but not limited to a single conveyor apparatus). Drive mechanism 108 can then extend or retract at a slower rate to allow the middle boom element 104 to "catch up" to the position of the front boom element 106. In this way, front boom element 106 can automatically maintain the distance from the operator in a relatively quick manner, and middle boom element 104 can then be adjusted more slowly into its new position relative to the user and the front boom element 106.

Drive mechanism 116 can include, among other elements, a motor, chain, belt, emergency-stop mechanism such as a button or otherwise, manual controls for moving the front boom element 106 or other portions of the extendible boom in any direction of which it is capable, contact bumper switches or other safety devices, or otherwise. In particular, drive mechanism 116 can include a proximity sensor, whether optical, sonar, or otherwise, that can detect the distance from front boom element 106 to an operator, the "stack" of parcels, or other objects, for automatic control of the movement and positioning of the boom elements. Drive mechanism 116 can communicate with other controllers or drive mechanisms to control the position and movement of the other boom elements with respect to the front boom element 106.

A control system 120 can communicate with and control the various elements of the extendible boom conveyor system 100 or the other devices and systems described herein. The control system includes executable code to perform processes as described herein.

When unloading an irregular parcel, sometimes the worker lays the irregular on the extendible conveyor system 100, walks alongside the irregular as it is transported, and the pulls it off again when it gets near the dock position. The worker then must manually hand off the irregular parcel to another worker. This takes time but at least the worker is not carrying the parcel. This must be done before the irregular goes too far into the conveyor system. Pulling it off quickly at the end before the belts take it too far is potentially hazardous. Further, if the irregular is not removed and continues on to the next-downstream device, such as a takeaway conveyor that is intended to carry only standard parcels, it is likely to cause a jam in other systems, resulting in work stoppage, delays, and possible equipment damage.

Disclosed embodiments include improvements to conventional extendible conveyor systems, for example by adding signaling devices (buttons that turn on indicator lamps) to tell the other dock worker that an irregular is coming his way, and by using a distance sensor, such as a laser distance sensor or a proximity sensor as described above, to determine when to stop the extendible conveyor so that the other worker can pull it off the belt.

Note that, in a typical process, the disclosed extendible conveyor system is typically transporting a flow of standard parcels that can be automatically transported along the conveyor and to the next-downstream device or system. An irregular, by definition, cannot be processed as a "regular" parcel, and so a system as disclosed herein can perform such processes as receiving inputs from workers that an irregular is being (or should be) loaded, unloaded, or transported, displaying indicators that an irregular is being (or should be) loaded, unloaded, or transported, stopping the belt at appropriate points to allow for the unloading or loading of the irregular, and other such actions to automate as much of the process of handling the irregular as possible.

In other embodiments, a transfer mechanism automatically removes the irregular from the extendible belt when it reaches the handoff position. By automatically intercepting the irregular parcel on top of the base, moving it to and from the staging shelf (or "unloading area") next to the extendible, a great deal of effort and pain is avoided by the worker.

When a conveyor has sideguards, the sideguards can make it difficult for a worker to move a large or heavy irregular off of the conveyor. The vast majority of belted extendibles do not have side guards and are capable of transporting most irregulars from the base module to the end of the last boom and vice versa. This mobility can be used by the worker to transport the irregulars in and out of the trailer if he chose to escort the irregular so that he can remove it from the belt at the base area. But this is a slow process and for most irregulars it's faster to just carry it out manually.

Disclosed embodiments provide a transfer mechanism that moves the irregular from the belt to the adjacent staging shelf, or vice versa when loading. This frees the worker to continue his job while the irregular lumbers along.

Figure 2:
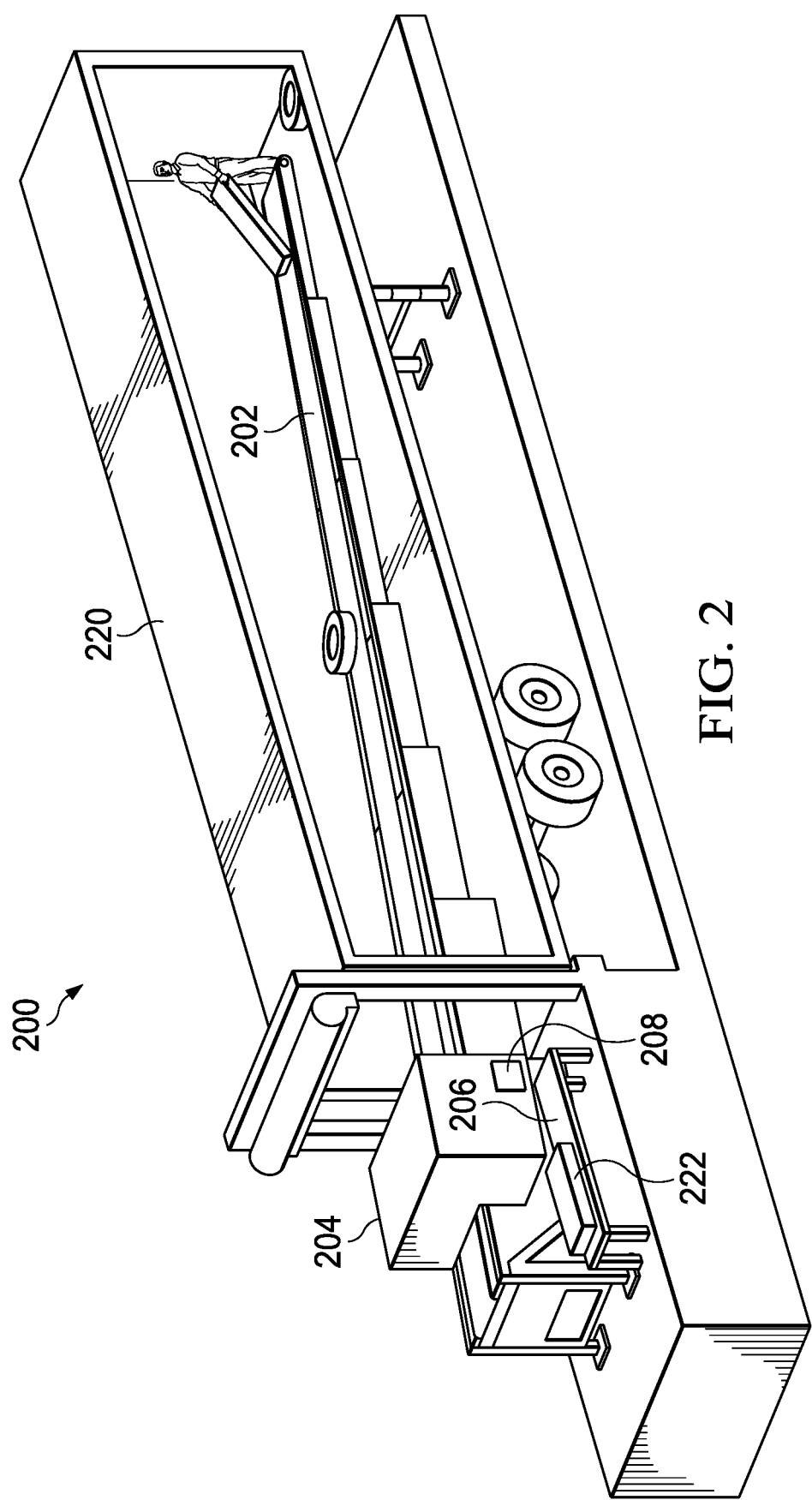
FIG. 2 illustrates an extendible conveyor system in accordance with disclosed embodiments.

FIG. 2 illustrates an extendible conveyor system 200 in accordance with disclosed embodiments. In this example, the extendible conveyor 202 extends into a container 220, in this case a trailer. At the "base" of the extendible conveyor system 200, for example, in the building or on the dock to and from which parcels are loaded, there is a transfer mechanism 204 which removes irregulars 222 from the belts of conveyor 202 and onto a shelf 206. In various embodiments, shelf 206 can be a takeaway conveyor or other active surface, or can be a static shelf, including a low-friction shelf surface.

As one illustrative example, in the context of FIG. 2, during the unloading process a button is available at the front of the last boom for the worker to signal that an irregular 222 was placed on the belt. The worker places the irregular on the belt of extendible conveyor 202 and activates an input device, such as pressing a button, and the extendible conveyor system 200 receives the user input via a control system such as control system 120. This tells the control system to track irregular 222 to the transfer mechanism 204.

A distance sensor, such as a laser sensor or other proximity sensor, can be used to detect the position of the booms of the extendible conveyor 202 and the control system can calculate when irregular 222 will reach the transfer mechanism 204. The control system can stop conveyor 202 when the irregular 222 is in place to be moved by transfer mechanism 204.

The transfer mechanism 204 can include one or more sensors to allow the control system to determine if the automatic transfer can take place. If so, then the transfer mechanism 204 transfers the irregular 222 to the shelf and restarts the belt. If the automatic transfer cannot be performed, then then the control system can activate one or more indicators and not restart the operation of the conveyor 202. This tells the worker to come to the base and transfer the irregular 222 manually. The transfer mechanism 204 can include a control panel or other input device 208 that enables the user to "jog" or otherwise operate the belt to place the irregular 222 in the best position for manual transfer.

Figure 3:
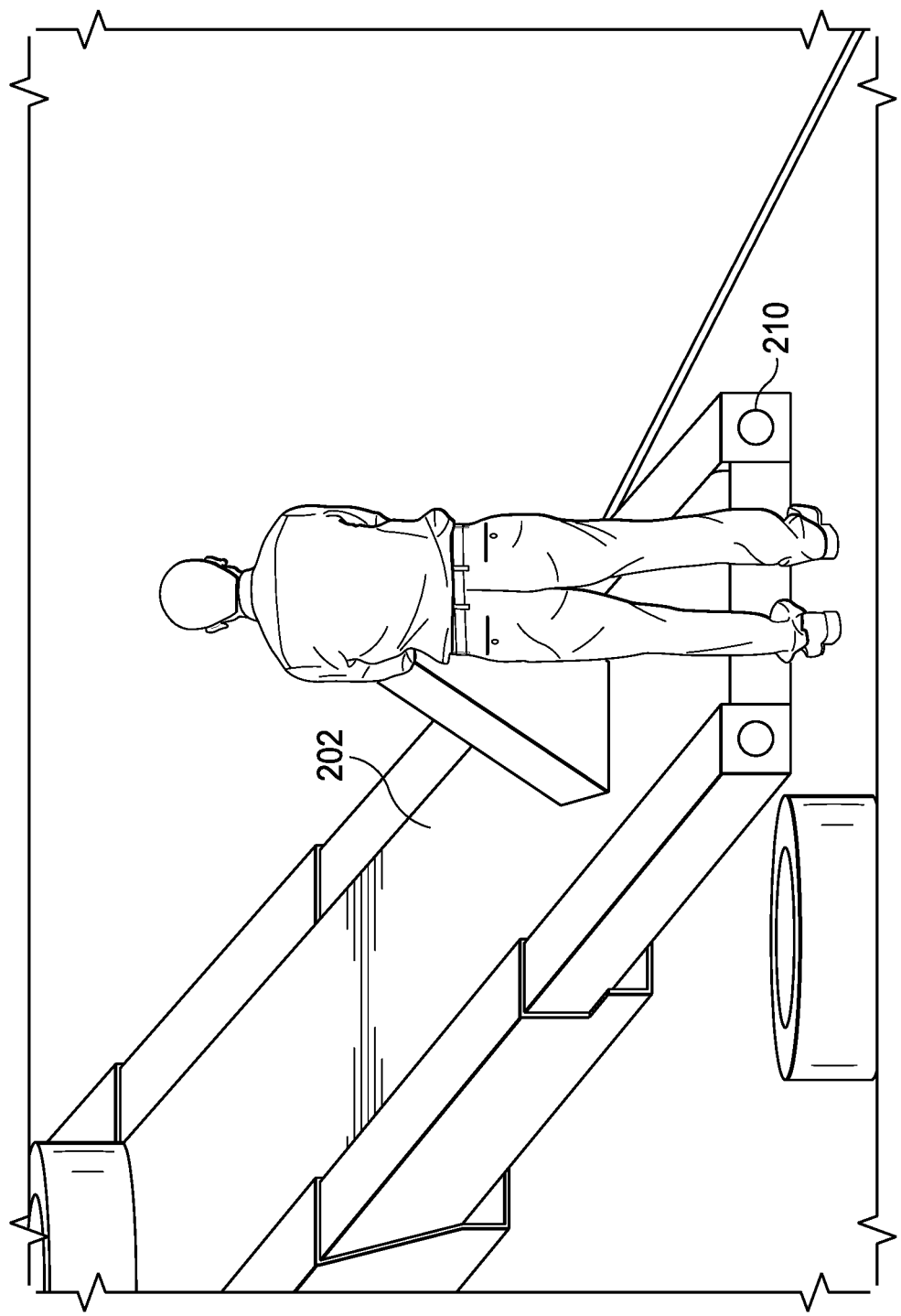
FIG. 3 illustrates an example of the far end of an extendible conveyor in accordance with disclosed embodiments.

FIG. 3 illustrates an example of the far end of an extendible conveyor 202 in accordance with disclosed embodiments. This example shows a button 210 that can act as the input device described above for the user to indicate that an irregular 222 is being placed on the conveyor 202. Further, button 210 can also act as an indicator, by lighting, flashing, or otherwise under the control of control system 120, to indicate that the irregular 222 cannot be automatically moved by the transfer mechanism 204 and must be manually transferred.

During the loading process, the worker in the container 220 can indicate to send in an irregular by activating the input device 208, such as pushing button 210. If an irregular 222 is sitting on the staging shelf 206 it will be transferred by the transfer mechanism 204 to the belt of conveyor 202 for transport to the worker. Sensors can indicate to the outside workers that are moving the irregulars 222 from base area to the staging shelf 206 that the item can or cannot be transferred to the extendible conveyor 202 automatically. Those minority of items that cannot be transferred automatically will have to be loaded into the container 220 manually.

Figure 4:
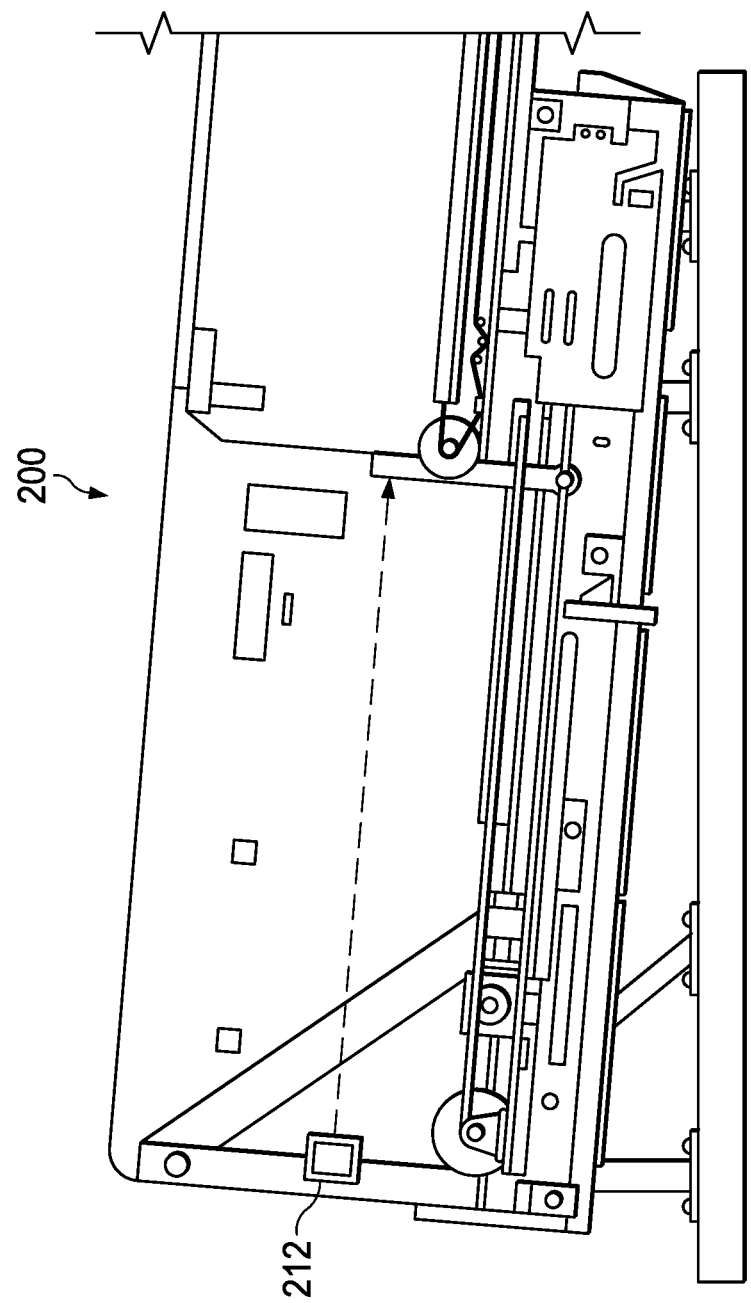
FIG. 4 illustrates an example of a distance sensor as a part of extendible conveyor system in accordance with disclosed embodiments.

FIG. 4 illustrates an example of a distance sensor 212, in this case a laser distance sensor, as a part of extendible conveyor system 200, in accordance with disclosed embodiments.

FIGS. 5-12 illustrate an exemplary implementation and operation of a transfer mechanism 204 in accordance with disclosed embodiments.

Figure 5:
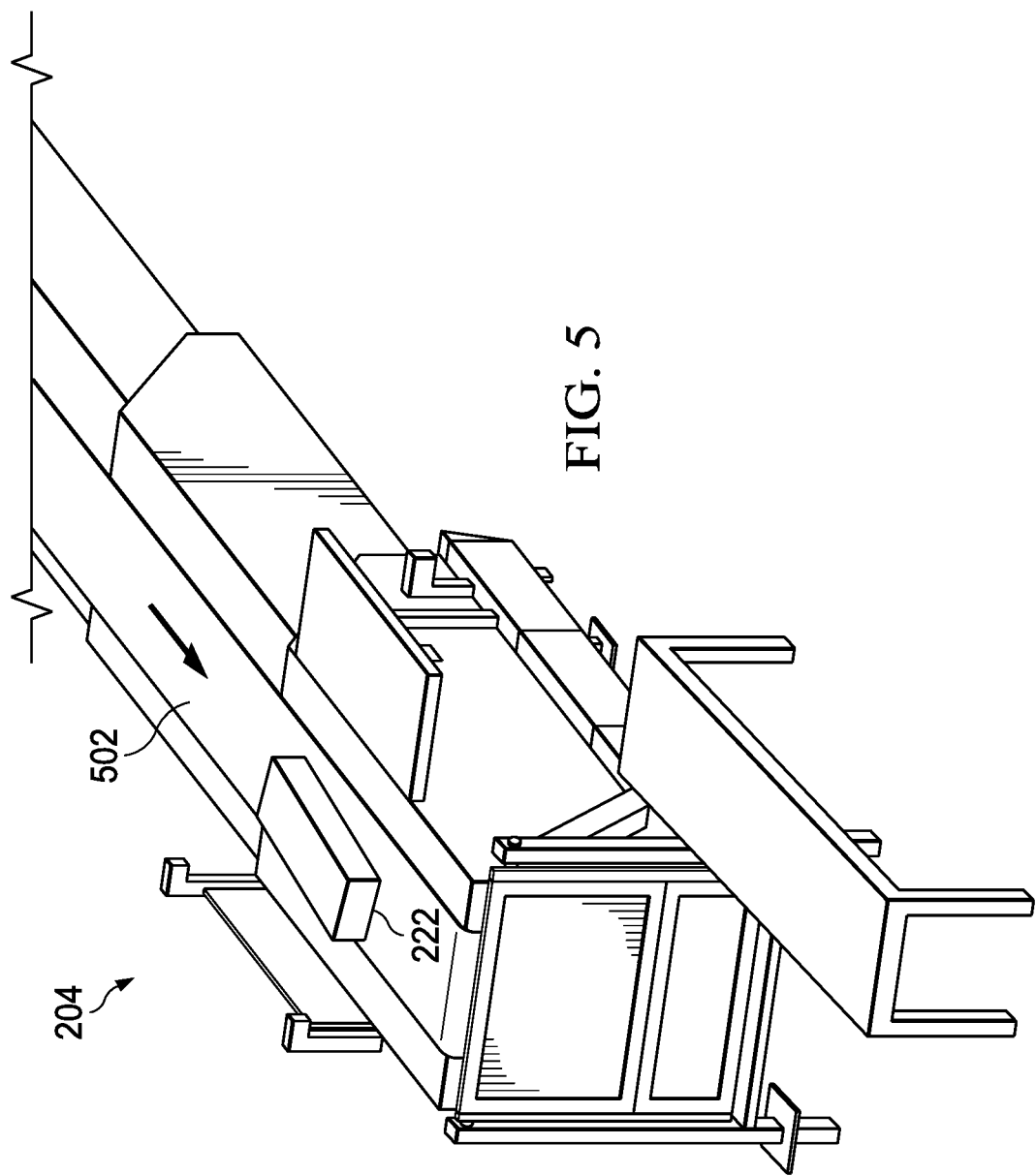
FIGS. 5-12 illustrate exemplary implementations and operations of transfer mechanisms in accordance with disclosed embodiments.

FIG. 5 illustrates the point where irregular 222 has been transported on conveyor belt 502 to the transfer mechanism 204. When the irregular 222 is in position, belt 502 stops.

Figure 6:
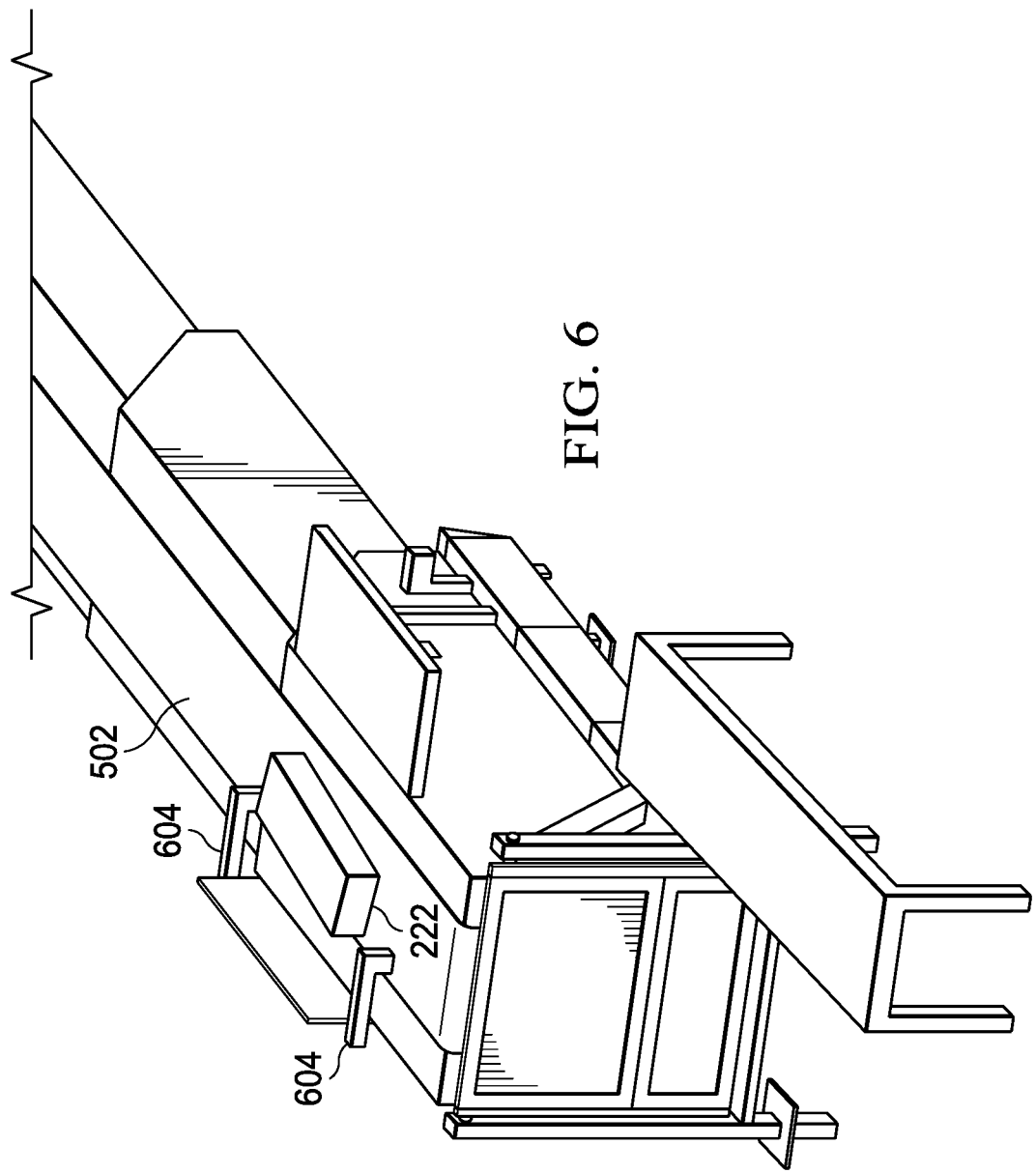

FIG. 6 illustrates that, in some embodiments, one or more clamps 604 can restrain the belt 502 while irregular 222 is transferred. Clamps 604 can be implemented using any mechanism suitable for restraining belt 502.

Figure 7:
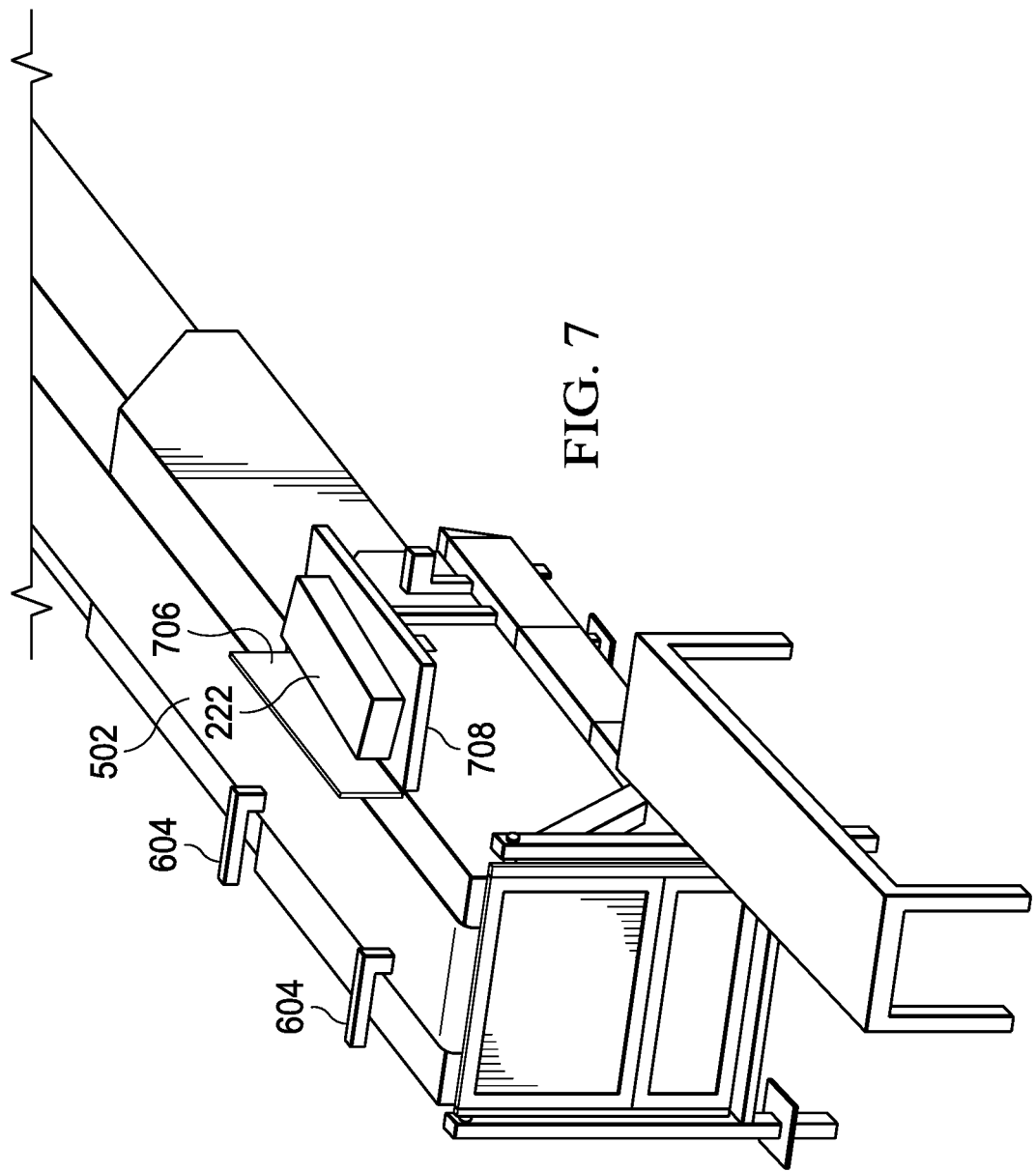

FIG. 7 illustrates the point where push-bar 706 pushes irregular 222 laterally off the belt 502 and onto elevator conveyor 708. Elevator conveyor 708 can raise and lower between the belt level and the shelf level and can convey objects on its surface. In this example, clamps 604 continue to restrain belt 502.

Figure 8:
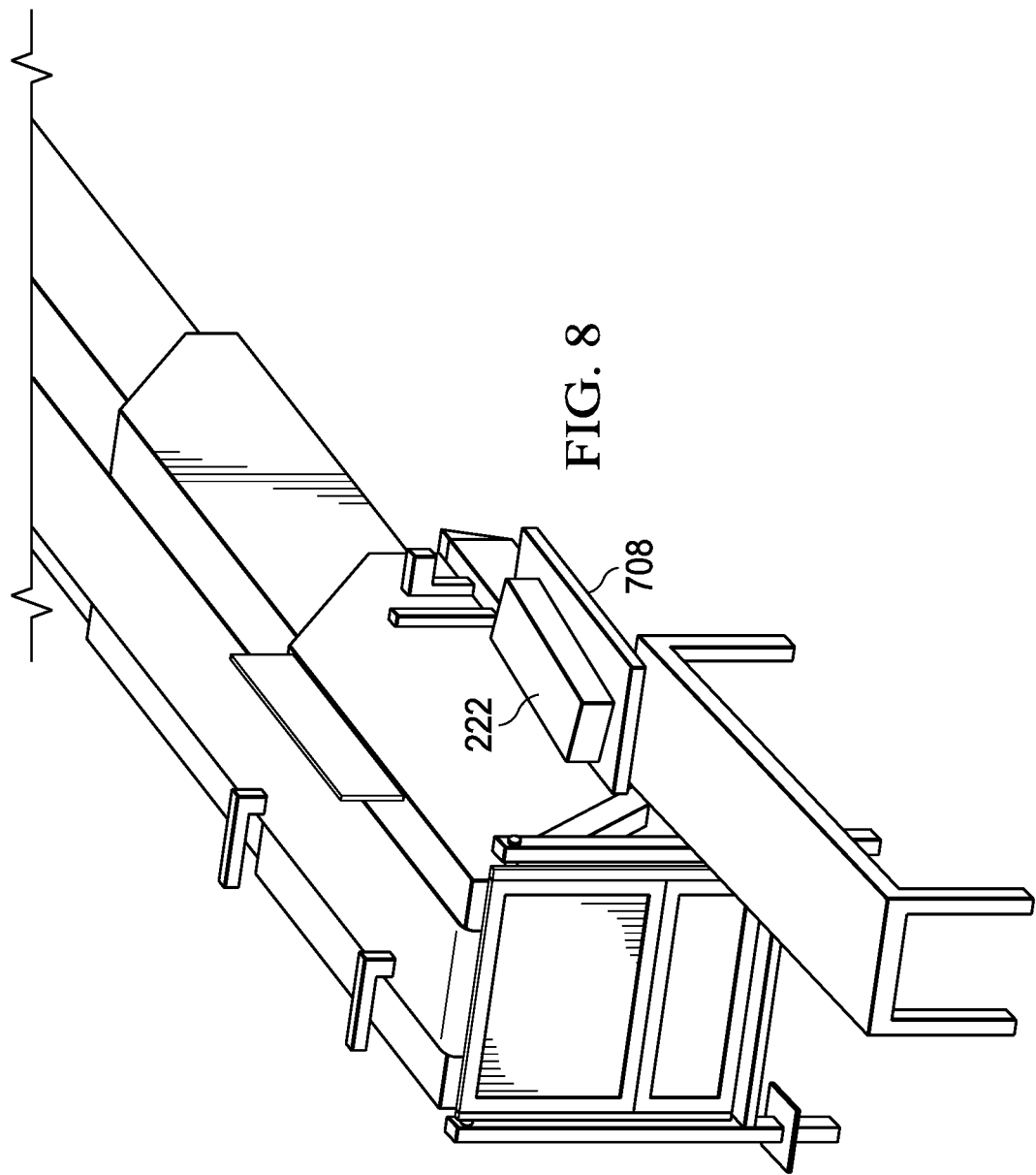

FIG. 8 illustrates the point where elevator conveyor 708 has lowered irregular 222 to shelf level.

Figure 9:
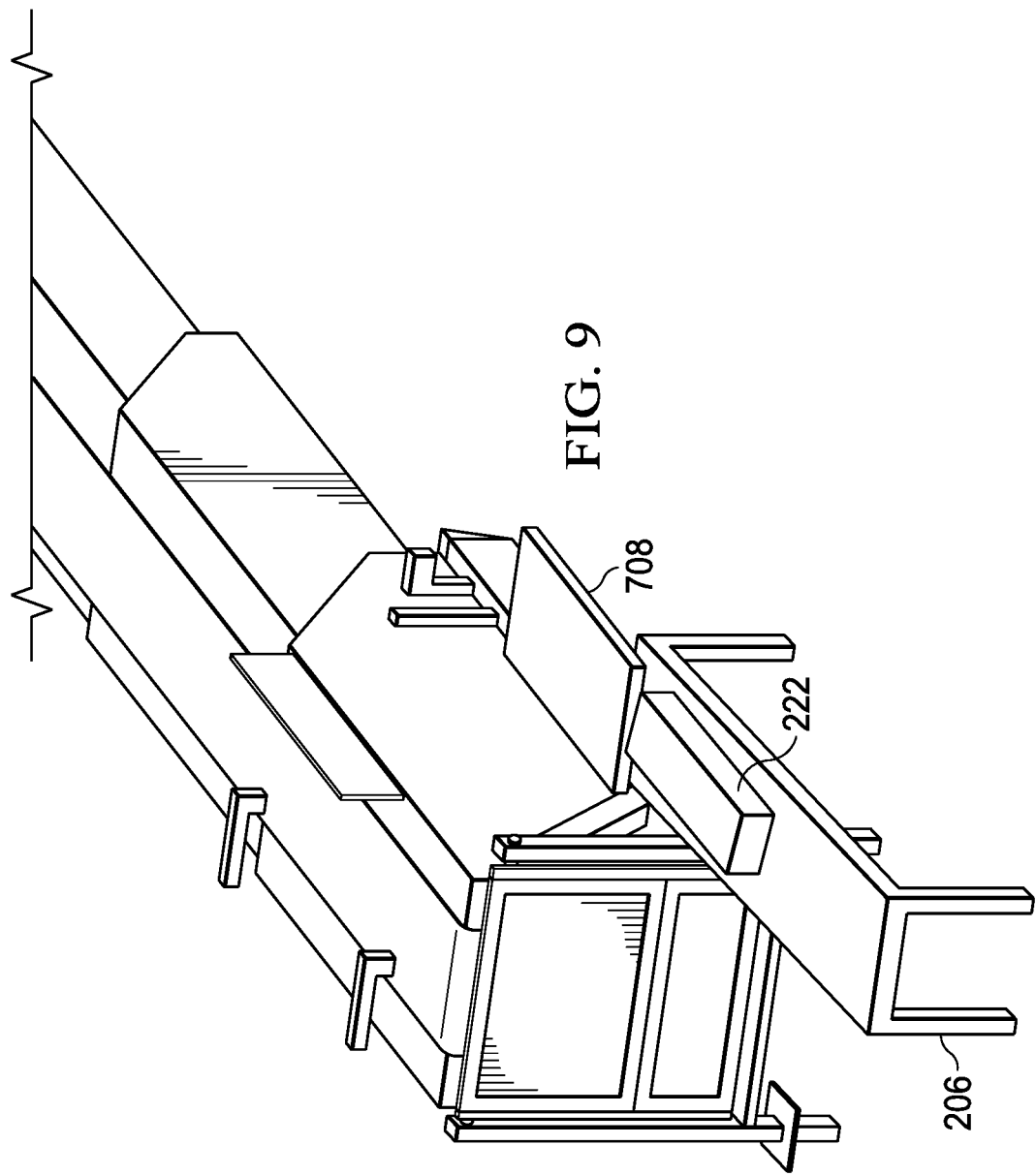

FIG. 9 illustrates the point where elevator conveyor 708 has transferred irregular 222 to shelf 206. As described above, shelf 206 can be a shelf, a takeaway conveyor, or other surface for placement of the irregular 222.

Figure 10:
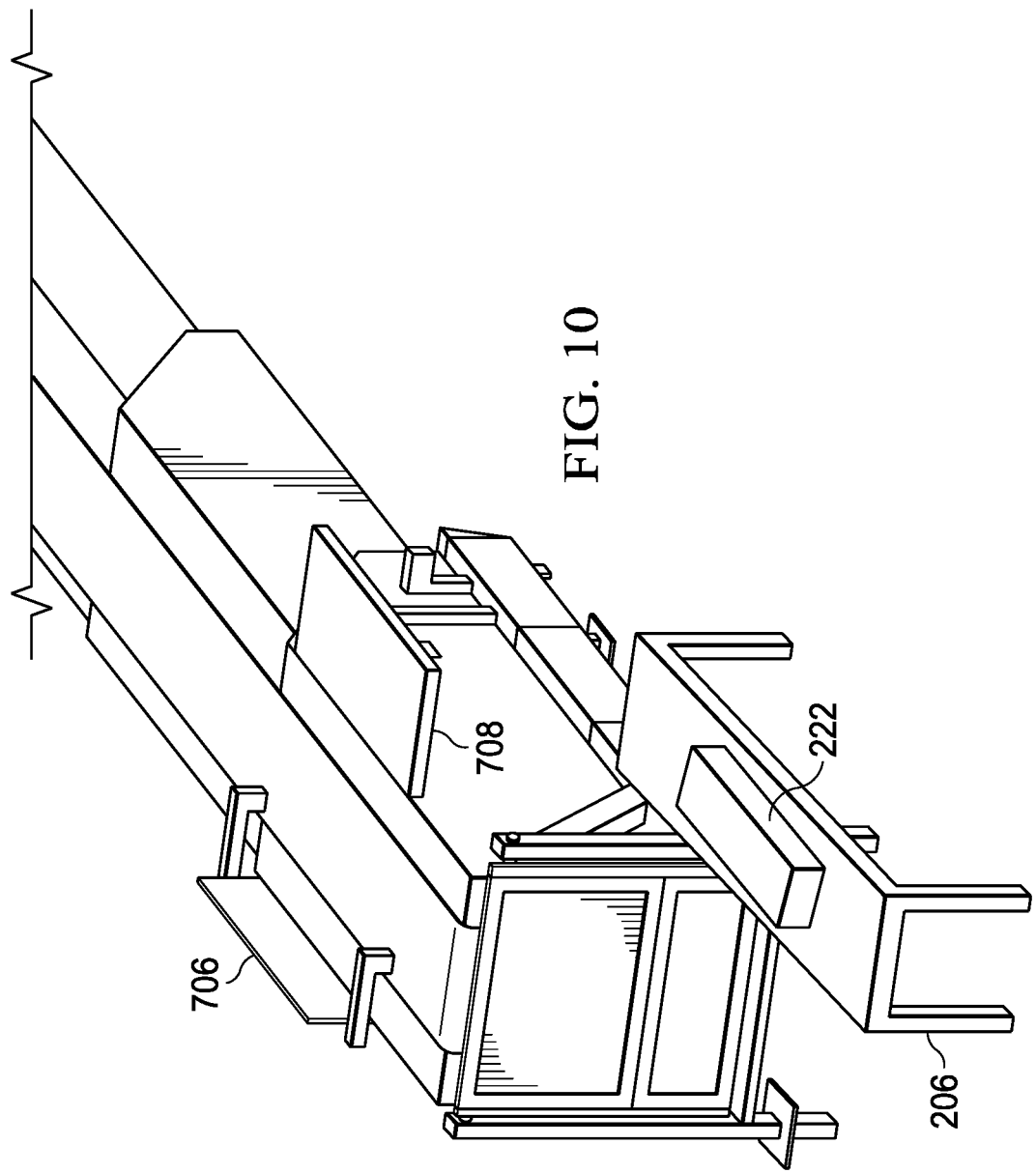

FIG. 10 illustrates the point where irregular 222 is on shelf 206 and ready for removal. Elevator conveyor 708 has returned to its raised "home" position. Pushbar 706 has returned to its retracted "home" position.

Figure 11:
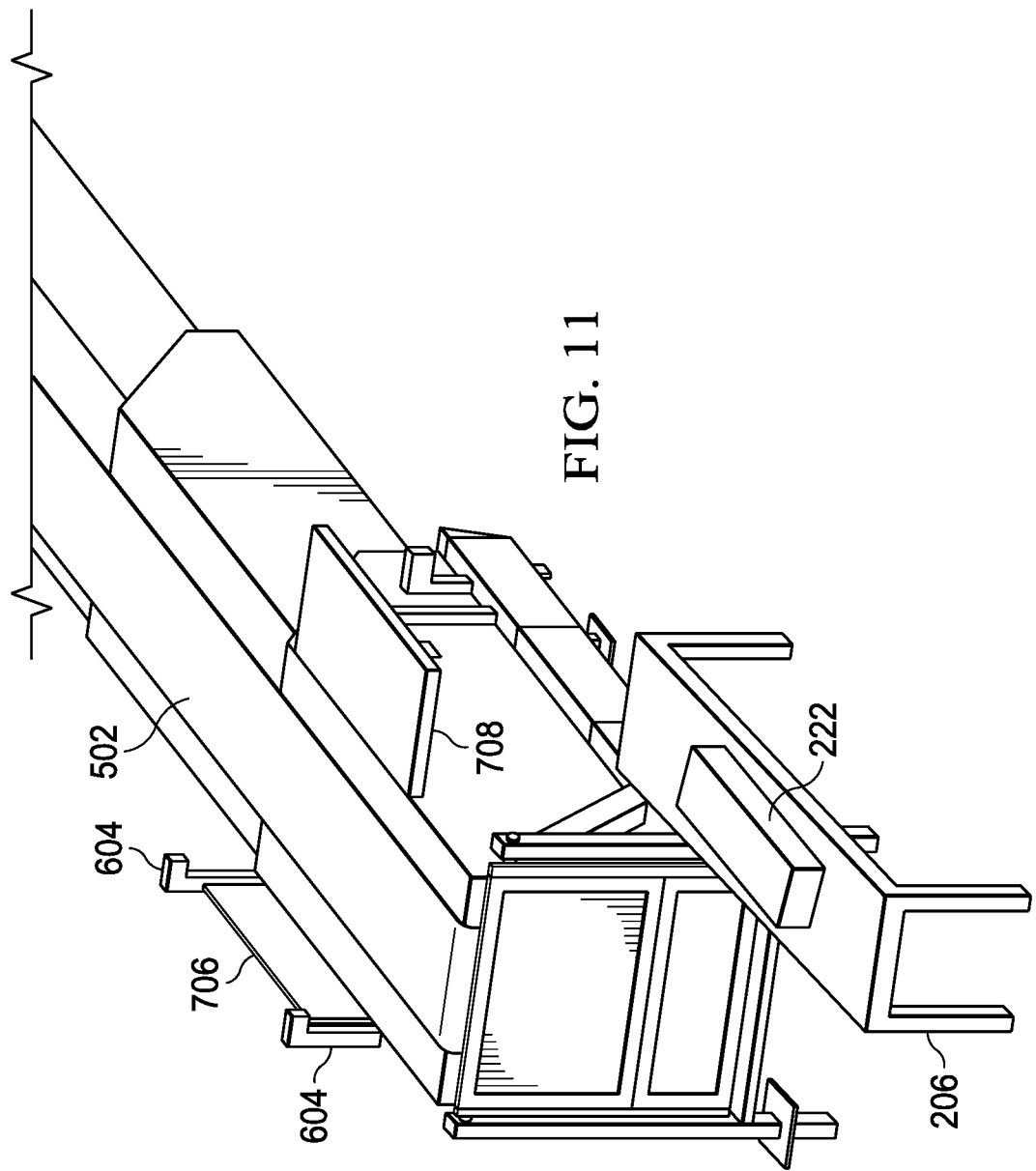

FIG. 11 illustrates the point where irregular 222 is on shelf 206 and ready for removal. Elevator conveyor 708 has returned to its raised "home" position. Pushbar 706 has returned to its retracted "home" position. Clamps 604 have returned to their "home" position, releasing belt 502 to resume normal operation.

Figure 12:
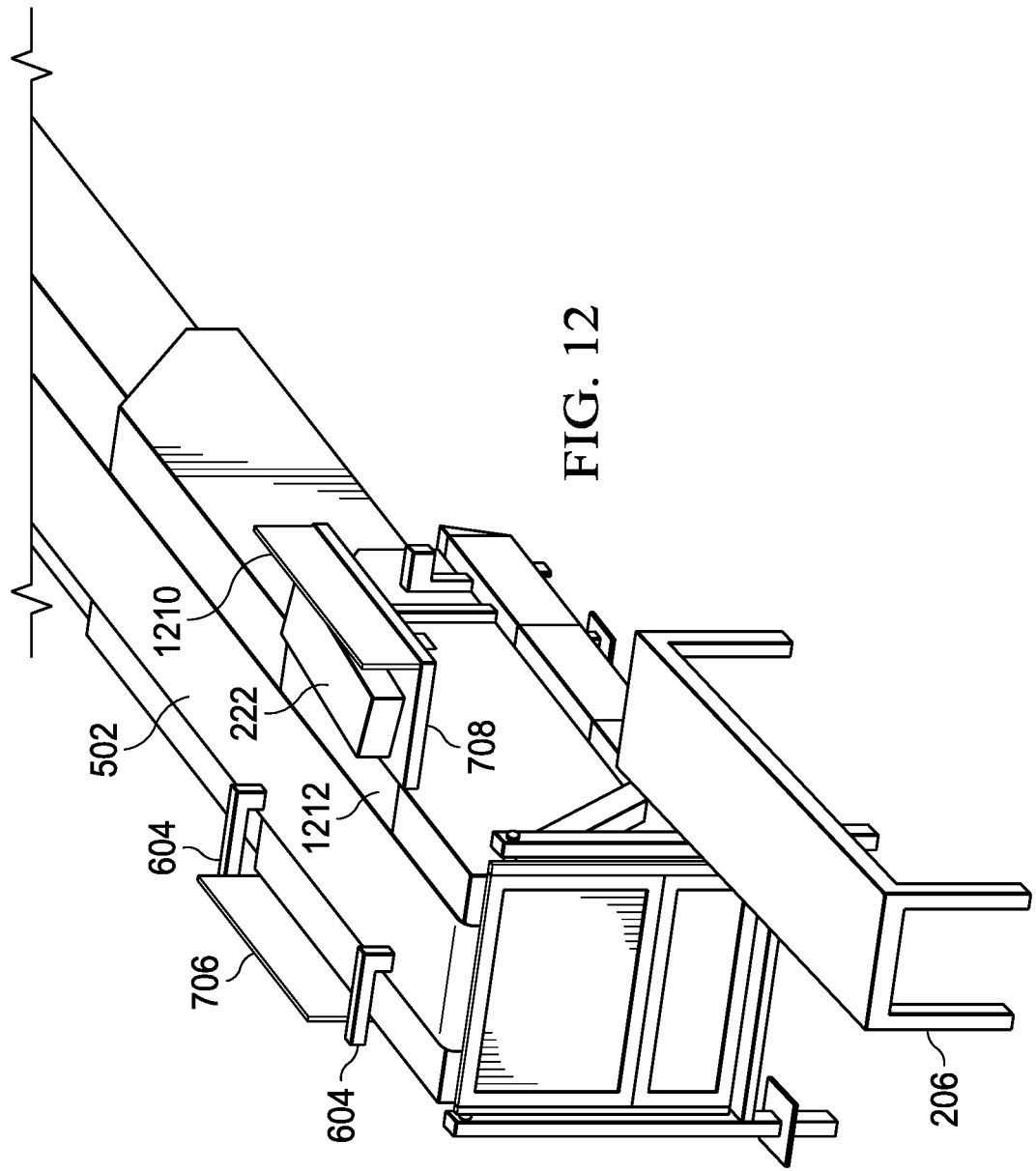

FIG. 12 illustrates another exemplary embodiment of a transfer mechanism 204 that is useful for a container loading process.

The transfer mechanism in this example includes features as described in the examples above, but includes further features to automatically transfer the irregular 222 from the shelf 206 to the belt 502. In this example, pushbar 706 remains in its "home" position, but the clamps 604 are lowered to clamp the belt 502 to keep it from moving while the transfer mechanism operates, similar to above.

At the point illustrated in this figure, shelf 206 has moved irregular 222 onto the elevator conveyor 708 (while it was in the lowered position), and elevator conveyor 708 has returned to its raised "home" position carrying the irregular.

In this example, elevator conveyor 708 has a lift pushbar 1210 that is configured to push the irregular 222 off of the elevator conveyor 708 and onto the belt 502. Belt 502 can then transport the irregular 222 to the end of the extendible conveyor to be manually removed from the conveyor and loaded into the container.

In some embodiments, transfer mechanism 204 can also include a transfer surface 1212 to facilitate sliding the irregular 222 between the belt 502 and the elevator conveyor 708. Transfer surface 1212 can be, for example, a piece of low friction UHMW-PE plastic sheet that is the same thickness as the belt. Transfer surface 1212 prevents the irregular 222 from snagging on the edge of belt 502, and enables the irregular 222 to slide more freely between the belt 502 and the elevator conveyor 708.

Figure 13:
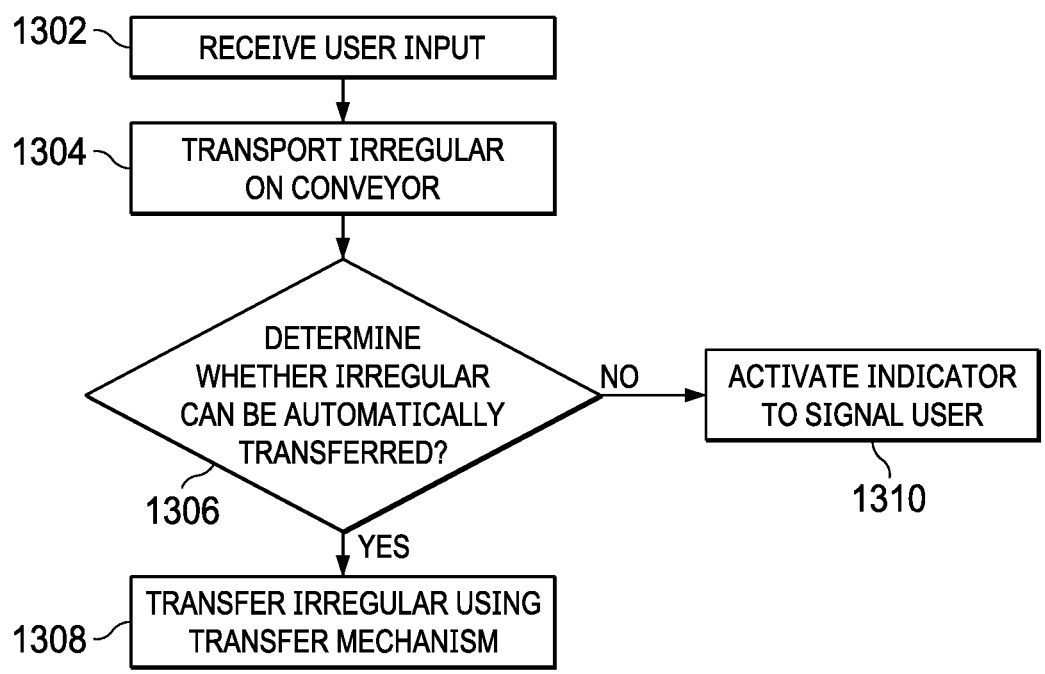
FIG. 13 illustrates a flowchart of a process in accordance with disclosed embodiments.

FIG. 13 illustrates a flowchart of a process in accordance with disclosed embodiments using an extendible conveyor system as disclosed herein.

In an embodiment of this process, the extendible conveyor is assumed to be placed such that its first boom element is proximate to or inside a trailer or other container so that parcels can be transported into the container by the extendible conveyor.

The extendible conveyor system receives an input from a user using an input device (1302). This can be, for example, the user in the container pressing a button to indicate that an irregular will be placed on the conveyor.

The extendible conveyor system transports the irregular along the conveyors from the end of the extendible container to the base of the extendible conveyor (1304).

The extendible conveyor system determines whether the irregular can be automatically transferred to an unloading area using a transfer mechanism (1306).

When the extendible conveyor system determines that the irregular can be automatically transferred to an unloading area using a transfer mechanism, the extendible conveyor system transfers the irregular from the conveyor to the unloading area using the transfer mechanism (1308).

When the extendible conveyor system determines that the irregular cannot be automatically transferred to an unloading area using a transfer mechanism, the extendible conveyor system activates an indicator to alert a user that the irregular must be manually unloaded (1310).

A more-manual unloading process in which the transfer mechanism cannot move the irregular to the shelf can still include many of the disclosed elements, even without a process of determining whether the irregular can be automatically transferred as in 1306. For example, the extendible conveyor system can receive the input as in 1302, transport the irregular as in 1304, and activate an indicator as in 1310, so that a worker can manually unload the irregular. Such a process can include operations such as stopping the belt, clamping the belt, making other signals or indications to users to indicate the state of the extendible conveyor system, or other operations.

Similarly, in a more-manual loading process, the system can perform many of these processes, such as stopping the belt, clamping the belt, ensuring enough room between other parcels for the irregular, receiving a user input to restart the belt, transporting the irregular from the base to the end of the extendible conveyor system, stopping the belt again (either automatically or manually), signaling to a worker that the irregular is coming or has arrived at the end of the conveyor, and/or restarting the belt after the worker has removed the irregular.

Figure 14:
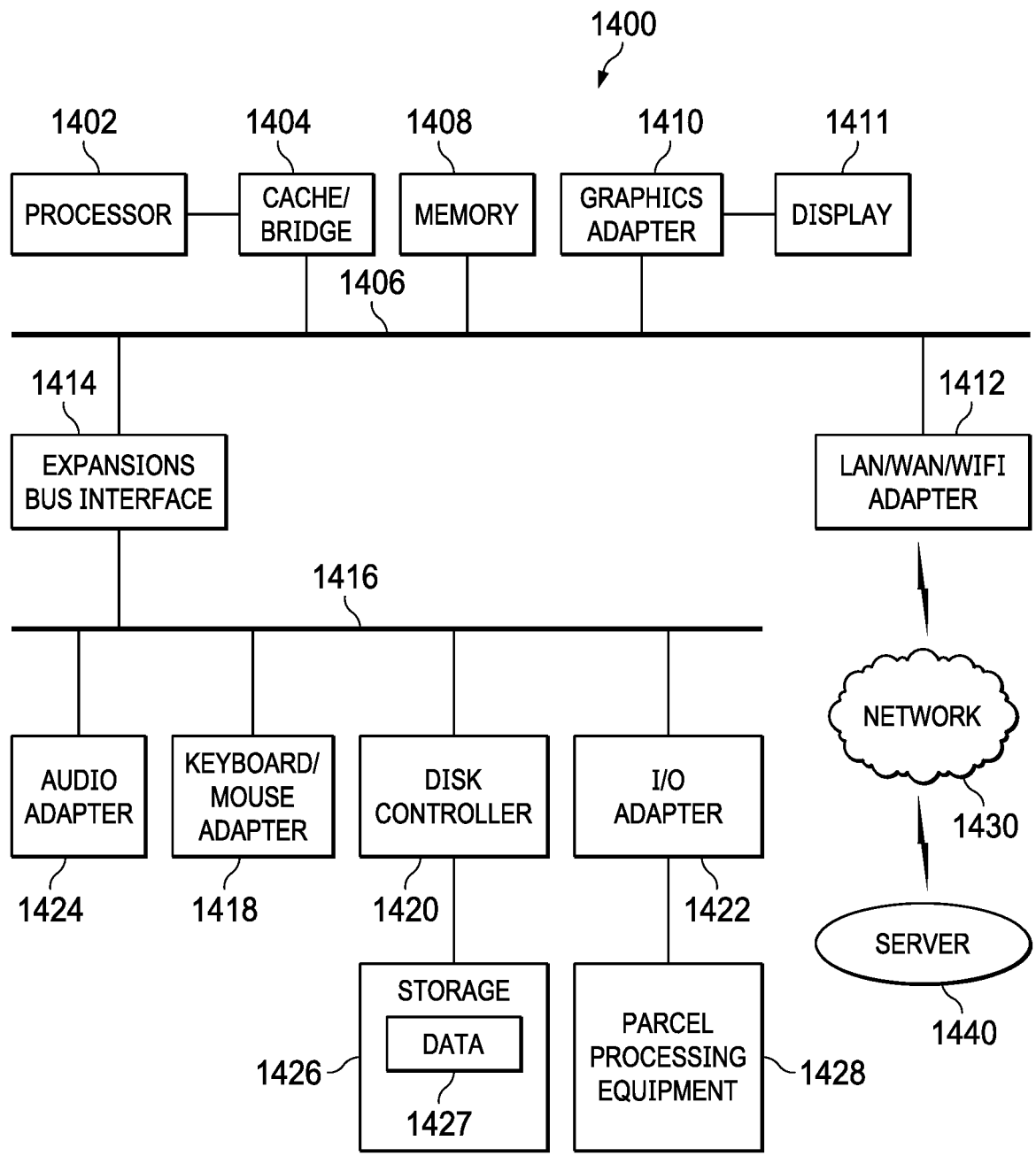
FIG. 14 illustrates a block diagram of a data processing system with which an embodiment can be implemented.

FIG. 14 illustrates a block diagram of a data processing system 1400 with which an embodiment can be implemented, for example as control system or other device configured by software or otherwise to perform the processes as described herein, and in particular as each one of a plurality of interconnected and communicating systems as described herein. The exemplary, non-limiting data processing system 1400 can be used, for example, as the control system 120 of the extendible conveyor system and/or as a control system any component or element. The data processing system depicted includes a processor 1402 connected to a level two cache/bridge 1404, which is connected in turn to a local system bus 1406. Local system bus 1406 may be, for example, a peripheral component interconnect (PCI) architecture bus. Also connected to local system bus in the depicted example are a main memory 1408 and a graphics adapter 1410. The graphics adapter 1410 may be connected to display 1411.

Other peripherals, such as local area network (LAN)/Wide Area Network/Wireless (e.g. WiFi) adapter 1412, may also be connected to local system bus 1406. Expansion bus interface 1414 connects local system bus 1406 to input/output (I/O) bus 1416. I/O bus 1416 is connected to keyboard/mouse adapter 1418, disk controller 1420, and I/O adapter 1422. Disk controller 1420 can be connected to a storage 1426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 1426 can store any data 1427 useful in performing processes as described herein, including any executable instructions, identifiers, statuses, distances, control instructions, parcel profile data, or other data.

I/O adapter 1422 is connected to control parcel processing equipment 1428, which can be any of the elements illustrated in FIGS. 1-12.

Also connected to I/O bus 1416 in the example shown is audio adapter 1424, to which speakers (not shown) may be connected for playing sounds. Keyboard/mouse adapter 1418 provides a connection for a pointing device (not shown), such as a mouse, trackball, trackpointer, touchscreen, etc.

Those of ordinary skill in the art will appreciate that the hardware depicted in FIG. 14 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of the MICROSOFT WINDOWS™ operating system, a product of Microsoft Corporation located in Redmond, Wash. may be employed if suitably modified. The operating system is modified or created in accordance with the present disclosure as described.

LAN/WAN/Wireless adapter 1412 can be connected to a network 1430 (not a part of data processing system 1400), which can be any public or private data processing system network or combination of networks, as known to those of skill in the art, including the Internet.

Data processing system 1400 can communicate over network 1430 with server system 1440, which is also not part of data processing system 1400, but can be implemented, for example, as a separate data processing system 1400. Data processing system 1400 can communicate with other elements as disclosed herein, such as communications between an operation station and various elements of the extendible conveyors, communications of data, sensor inputs, and indicator outputs between various elements, etc.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. An extendible conveyor system comprising:
   an extendible conveyor configured to extend into a container;
   at least one belt on the extendible conveyor configured to transport an irregular parcel from the container to a base end of the extendible conveyor; and
   a transfer mechanism configured to move the irregular parcel from the at least one belt to a shelf,
   wherein the transfer mechanism is configured to restrain the at least one belt when the irregular parcel is being moved to the shelf.

2. The extendible conveyor system of claim 1, wherein the shelf is a takeaway conveyor.

3. The extendible conveyor system of claim 1, further comprising a control system configured to control the at least one belt and the transfer mechanism to transport the irregular parcel from the container and onto the shelf.

4. The extendible conveyor system of claim 1, wherein the transfer mechanism includes an elevator conveyor and at least one of: a pushbar configured to push the irregular parcel from the at least one belt and onto the elevator conveyor, a lift pushbar configured to push the irregular parcel from the elevator conveyor and onto the at least one belt, or a low-friction transfer surface disposed between the elevator conveyor and the at least one belt.

5. A method performed by an extendible conveyor system having an extendible conveyor configured to extend into a container, at least one belt on the extendible conveyor, and a transfer mechanism, comprising:
   transporting an irregular parcel on the at least one belt from the container to a base end of the extendible conveyor;
   moving the irregular parcel from the at least one belt to a shelf using the transfer mechanism; and
   restraining the at least one belt when the irregular parcel is being moved to the shelf.

6. The method of claim 5, wherein the shelf is a takeaway conveyor.

7. The method of claim 5, wherein the extendible conveyor system further comprises a control system configured to control the at least one belt and the transfer mechanism.

8. The method of claim 5, wherein the transfer mechanism includes an elevator conveyor and a pushbar configured to push the irregular parcel from the at least one belt and onto the elevator conveyor.

9. An extendible conveyor system comprising:
   an extendible conveyor configured to extend into a container;
   at least one belt on the extendible conveyor configured to transport an irregular parcel from the container to a base end of the extendible conveyor;
   an input device configured to receive a user input that the irregular parcel is to be transported; and an indicator configured to indicate that the irregular parcel has been transported to the base end of the extendible conveyor, for indicating that the irregular parcel must be manually transferred from the extendible conveyor.

10. The extendible conveyor system of claim 9, further comprising a distance sensor configured to calculate an extension distance, the extension distance being the distance the extendible conveyor has extended into the container.

11. The extendible conveyor system of claim 10, further comprising a control system configured to: use the extension distance to calculate an irregular travel distance, which is the distance the at least one belt should travel to transport the irregular parcel to the base end of the extendible conveyor; to stop the at least one belt on the extendible conveyor when the at least one belt has moved the irregular travel distance; and to activate the indicator.

12. The extendible conveyor system of claim 10, wherein the distance sensor is one of a laser distance sensor or a proximity sensor.

13. The extendible conveyor system of claim 9, wherein the control system is further configured to cause the at least one belt to remain stopped when the irregular parcel has been transported to the base end of the extendible conveyor until the irregular parcel has been removed from the extendible conveyor.

14. A method performed by an extendible conveyor system having an extendible conveyor configured to extend into a container and at least one belt on the extendible conveyor, comprising:

receiving a user input that an irregular parcel is to be transported, transporting the irregular parcel on the at least one belt from the container to a base end of the extendible conveyor; and activating an indicator when the irregular parcel has been transported the base end of the extendible conveyor, for indicating that the irregular parcel must be manually transferred from the extendible conveyor.

15. The method of claim 14, further comprising detecting, using a distance sensor, when the irregular parcel has reached the base end of the extendible conveyor.

16. The method of claim 15, wherein the distance sensor is one of a laser distance sensor or a proximity sensor.

17. The method of claim 14, further comprising stopping the at least one belt when the irregular parcel has been transported to a base end of the extendible conveyor until the irregular parcel has been removed from the extendible conveyor.

18. The method of claim 14, further comprising calculating, by a control system, when the irregular parcel will reach the base end of the extendible conveyor and stopping the at least one belt on the extendible conveyor when the irregular parcel has reached the base end of the extendible conveyor.

* * * * *